United States Patent
Doster et al.

(10) Patent No.: US 10,635,098 B2
(45) Date of Patent: Apr. 28, 2020

(54) SYSTEMS AND METHODS FOR PROVIDING A VIRTUAL VEHICLE FLEET

(71) Applicant: Toyota Connected North America, Inc., Plano, TX (US)

(72) Inventors: Preston Doster, Frisco, TX (US); David Tsai, Irvine, CA (US); Scott Meyer, Allen, TX (US)

(73) Assignee: TOYOTA CONNECTED NORTH AMERICA, INC., Plano, TX (US)

( * ) Notice: Subject to any disclaimer, the term of this patent is extended or adjusted under 35 U.S.C. 154(b) by 244 days.

(21) Appl. No.: 15/815,117

(22) Filed: Nov. 16, 2017

(65) Prior Publication Data
US 2019/0146486 A1    May 16, 2019

(51) Int. Cl.
| | |
|---|---|
| G05D 1/00 | (2006.01) |
| G06Q 10/04 | (2012.01) |
| G07C 5/00 | (2006.01) |
| G09B 9/00 | (2006.01) |
| G08G 1/00 | (2006.01) |

(52) U.S. Cl.
CPC .......... *G05D 1/0027* (2013.01); *G06Q 10/04* (2013.01); *G07C 5/008* (2013.01); *G09B 9/00* (2013.01); *G09B 9/006* (2013.01); *B60W 2550/404* (2013.01); *B60W 2750/40* (2013.01); *G05D 2201/0213* (2013.01); *G08G 1/202* (2013.01)

(58) Field of Classification Search
CPC ......... G05D 1/0027; G05D 2201/0213; G07C 5/008; G09B 9/00; G09B 9/006; B60W 2550/404; B60W 2750/40; G08G 1/202; G06Q 10/04
See application file for complete search history.

(56) References Cited

U.S. PATENT DOCUMENTS

| | | | | |
|---|---|---|---|---|
| 2013/0311153 A1* | 11/2013 | Moughler | ............ | G06Q 10/047 703/6 |
| 2014/0107912 A1* | 4/2014 | Yucel | ..................... | G07C 5/085 701/123 |
| 2017/0132334 A1* | 5/2017 | Levinson | ............ | G06F 17/5009 |

(Continued)

FOREIGN PATENT DOCUMENTS

| | | |
|---|---|---|
| CN | 101872559 A | 10/2010 |
| CN | 105336242 A | 2/2016 |

(Continued)

OTHER PUBLICATIONS

Virtual Hazard Detection from Virtual Driver Interactive; "Fleet Driver Safety—One Hour of Highly Interactive Training to Reduce Crashes"; URL: http://www.driverinteractive.com/virtual-hd/; Jul. 13, 2017.

*Primary Examiner* — Courtney D Heinle
(74) *Attorney, Agent, or Firm* — Dinsmore & Shohl LLP (57) ABSTRACT

Systems and methods for providing a virtual vehicle fleet are provided. One embodiment of a method includes creating a virtual vehicle, where the virtual vehicle provides a telematics service and replicating the virtual vehicle to create the virtual vehicle fleet, where the virtual vehicle fleet includes a plurality of virtual vehicles. Some embodiments include simulating use of the telematics service by at least a portion of the virtual vehicle fleet, determining a response characteristic of the simulated telematics service used by the virtual vehicle fleet, and providing data related to the response characteristic for output.

20 Claims, 8 Drawing Sheets

(56) References Cited

U.S. PATENT DOCUMENTS

| | | | |
|---|---|---|---|
| 2017/0178419 A1* | 6/2017 | Paridel | G06F 17/5009 |
| 2018/0260500 A1* | 9/2018 | Hati | G06F 17/5009 |
| 2019/0011931 A1* | 1/2019 | Selvam | G05D 1/0291 |
| 2019/0050276 A1* | 2/2019 | Kim | B60R 16/02 |

FOREIGN PATENT DOCUMENTS

| | | |
|---|---|---|
| CN | 105718065 A | 6/2016 |
| CN | 104614187 B | 5/2017 |
| WO | 2001037118 A2 | 5/2001 |

\* cited by examiner

FILE   EDIT   FAVORITES   TOOLS   HELP

BACK   SEARCH   FAVORITES

ADDRESS   GO

CREATE VIRTUAL VEHICLE FLEET

☑ USE THIS VEHICLE

CURRENT VEHICLE 1:
MODEL: XXX
MILEAGE: 100,000
AGE: 5 YEARS
ENGINE: GOOD
BRAKE: FAIR
TIRE: POOR

DRIVER 1:
GENDER: MALE
AGE: 17
TYPE: AGGRESSIVE
EMOTION: CALM
DISTRACTIONS: RADIO

☐ USE THIS VEHICLE

CURRENT VEHICLE 2:
MODEL: YYY
MILEAGE: 60,000
AGE: 3 YEARS
ENGINE: EXCELLENT
BRAKE: FAIR
TIRE: GOOD

DRIVER 2:
GENDER: FEMALE
AGE: 33
TYPE: DEFENSIVE
EMOTION: CALM
DISTRACTIONS: 2 PASSENGERS

- DEFINE VARIANCE — 332
- FLEET SIZE — 334
- WEATHER — 336
- TRAFFIC — 338
- CONSTRUCTION — 340
- FLEET TYPE/LOCATION — 342

☐ DONE

SYSTEMS AND METHODS FOR PROVIDING A VIRTUAL VEHICLE FLEET

TECHNICAL FIELD

Embodiments described herein generally relate to systems and methods for providing a virtual vehicle fleet and, more specifically, to simulating a vehicle and fleet of virtual vehicles to determine a response characteristics of a telematics service.

BACKGROUND

Many current vehicles provide telematics services, such as vehicle assistance, crash monitoring and reporting, live navigation, and the like. While these systems provide increased functionality to the users, when a new service is rolled out, testing must currently be performed in physical vehicles on the road in various regions. This causes problems because (a) the sample size is often much smaller than will be actually utilized; (b) it is often difficult and/or expensive to implement the service on even a small number of vehicles; and (c) it is often difficult to simulate scenarios that could occur when the system is in full use.

SUMMARY

Systems and methods for providing a virtual vehicle fleet are described. One embodiment of a method includes creating a virtual vehicle, where the virtual vehicle provides a telematics service and replicating the virtual vehicle to create the virtual vehicle fleet, where the virtual vehicle fleet includes a plurality of virtual vehicles. Some embodiments include simulating use of the telematics service by at least a portion of the virtual vehicle fleet, determining a response characteristic of the simulated telematics service used by the virtual vehicle fleet, and providing data related to the response characteristic for output.

In another embodiment, a system for providing a virtual vehicle fleet includes a simulation computing device that includes a memory component that stores logic, that when executed by the simulation computing device, causes the system to receive user input for creating a virtual vehicle, where the user input includes at least one characteristic of the virtual vehicle, and create the virtual vehicle, where the virtual vehicle provides a telematics service. In some embodiments, the logic further causes the system to create the virtual vehicle fleet from the virtual vehicle, where the virtual vehicle fleet includes a plurality of virtual vehicles, and where at least a portion of the plurality of virtual vehicles provides the telematics service. Some embodiments of the logic cause the system to simulate use of the telematics service on at least a portion of the virtual vehicle fleet, determine a response characteristic of a simulated telematics service of the virtual vehicle fleet, and provide data related to the response characteristic for output.

In yet another embodiment, a computing device includes a memory component that stores logic, that when executed by the computing device, causes the computing device to create a virtual vehicle that is a simulation of a physical vehicle and provides a telematics service, and create the virtual vehicle fleet from the virtual vehicle, where the virtual vehicle fleet includes a plurality of virtual vehicles, and where there is a predetermined variance among the plurality of virtual vehicles in the virtual vehicle fleet. In some embodiments, the logic causes the computing device to simulate use of the telematics service by at least a portion of the virtual vehicle fleet, determine a response characteristic of use of the simulated telematics service, and provide data related to the response characteristic for output.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for providing a virtual vehicle fleet. Some embodiments include creating the virtual vehicle fleet; simulating scenarios of a telematics service with the virtual vehicle fleet; and simulating user interfaces in the virtual vehicle fleet. Embodiments of these features may utilize a virtual vehicle (which may be a simulation of a physical vehicle, whether physically existing or not), virtual vehicle fleet, a data communication module, and/or a virtual head unit. As indicated above, the virtual vehicle may be created with details such as vehicle type and model, owner data, mileage, driver preferences, vehicle services, etc. The virtual vehicle may be replicated and modified to create a representative virtual vehicle fleet.

In simulating scenarios with the virtual vehicle fleet, the data communication module may implement telematics services such as stolen vehicle services, crash alert services, etc. to one or more of the virtual vehicles in the virtual vehicle fleet. Once the virtual vehicle fleet is replicated, the data communication module may provide one or more predetermined vehicle services to at least one of the virtual vehicles. Additionally, the system may implement a script that indicates that (for example) 5% of the vehicles have experienced a vehicle crash alert. A test may then be run to determine how well the crash response system responds to that scenario.

In simulating user interfaces in the virtual vehicle fleet, a virtual head unit may provide communications as they would be provided to the user. Operation of the virtual head unit may also be monitored to determine user experience. The systems and methods for providing a virtual vehicle fleet incorporating the same will be described in more detail, below.

Figure 1:
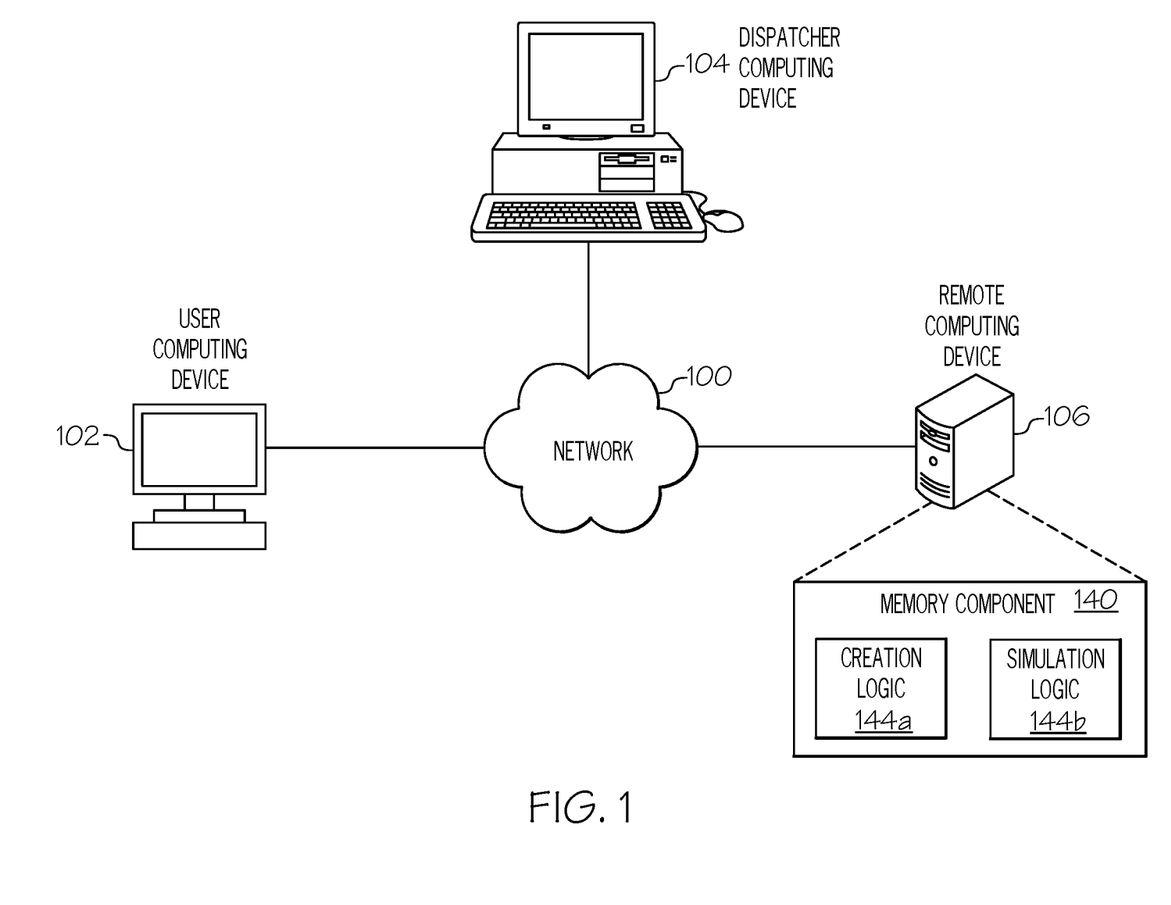
FIG. 1 depicts a computing environment for providing a virtual vehicle fleet, according to embodiments described herein.

Referring now to the drawings, FIG. 1 depicts a computing environment for providing a virtual vehicle fleet, according to embodiments described herein. As illustrated, the computing environment includes a network 100, a user computing device 102, a dispatcher computing device 104, and a simulation computing device 106. The network 100 may include any wide area network (such as the internet, a mobile device network, a cellular network, a telephone network, a WiMax network, a satellite network, etc.) or local network (such as a Wi-Fi network, a local area network, an Ethernet network, a Bluetooth network, a near field communication network, etc.). As such, some communications may utilize an intermediary, while some communications may communicate between endpoints, without an intermediary.

The user computing device 102 may include a personal computer, laptop, tablet, mobile device, server, etc. As described in more detail below, the user computing device 102 may be utilized for receiving user input for creating a virtual vehicle, a virtual vehicle fleet, and/or simulating a telematics service on the virtual vehicle and/or virtual vehicle fleet.

The dispatcher computing device 104 may also be configured as a personal computer, laptop, tablet, mobile device, server, etc. and may be configured for dispatching at least a portion of a telematics service. As an example, the dispatcher computing device 104 may be associated with an emergency medical technician network that dispatches ambulances or police in the event of an accident. As another example, the dispatcher computing device 104 may be associated with a live navigation service that provides audio directions to a driver of a vehicle. It should be understood that while the dispatcher computing device 104 may interface with a human dispatcher; this is merely an example, as some embodiments of telematics services may utilize a virtual dispatcher for performing and/or simulating this service.

The simulation computing device 106 may similarly be configured as a personal computer, laptop, tablet, mobile device, and/or server. Additionally, the simulation computing device 106 may include a memory component 140, which stores creation logic 144a and simulation logic 144b. As described in more detail below, when executed by a processor (such as the processor 830 from FIG. 8), the creation logic 144a may cause the system to create a virtual vehicle and/or virtual vehicle fleet. When executed, the simulation logic 144b may apply a telematics service to a created virtual vehicle and/or virtual vehicle fleet and monitor a response characteristic of the telematics service.

Figure 2:
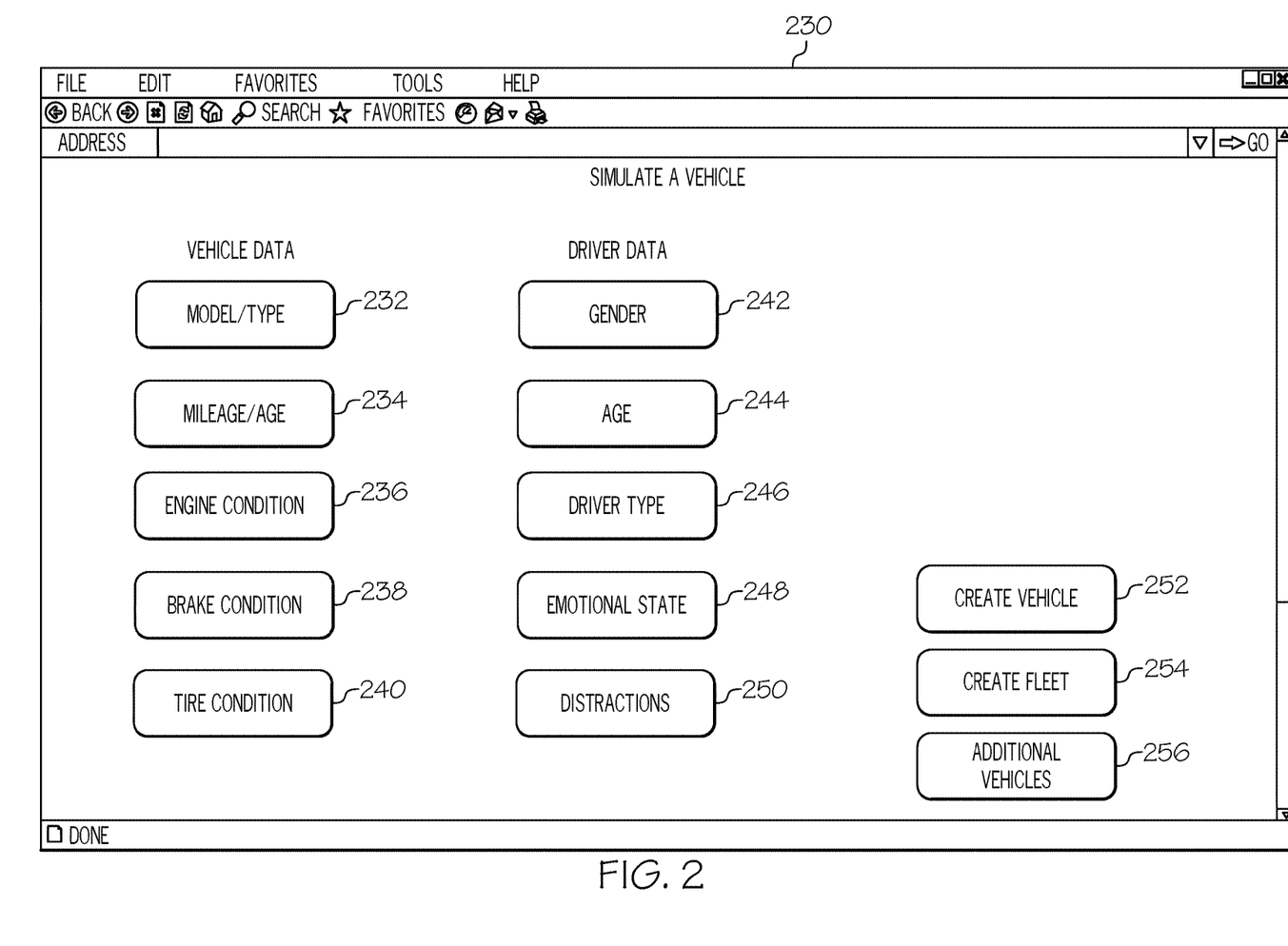
FIG. 2 depicts a user interface for creating a virtual vehicle, according to embodiments described herein.

FIG. 2 depicts a user interface 230 for creating a virtual vehicle, according to embodiments described herein. As illustrated, the user interface 230 may provide one or more options for creating a simulated vehicle. The user interface 230 may provide options for a user to determine at least one characteristic of a virtual vehicle, such as providing a model/type option 232, a mileage/age option 234, an engine condition option 236, a brake condition option 238, and a tire condition option 240. Additional data regarding the virtual vehicle may also be received, such a vehicle identification number (VIN), vehicle head unit type, communications protocol, etc.

In response to receiving user input regarding selection of the model/type option 232, the user may select a model and/or type of vehicle that will be represented as the virtual vehicle. Depending on the particular embodiment, this may include defining a vehicle make, a vehicle model, and/or the type of vehicle (sedan, station wagon, sport utility vehicle, sports car, taxi, semi, ambulance, firetruck, police vehicle, 2-wheel drive vehicle, 4-wheel drive vehicle, etc.). In response to selection of the mileage/age option 234 the user may input the mileage of the virtual vehicle and/or the year that the virtual vehicle was made.

In response receiving user input related to selection of the engine condition option 236, the user may select a condition of the engine (such as poor, fair, good, and excellent), and/or may provide more details, such as service history, model history, etc.). In response to selection of the brake condition option 238, the user may specify a condition of the brakes and/or may provide an age, brand, type, and/or other data associated with the brakes. In response to selection of the tire condition option 240, the user may provide information related to the condition of the tires, age of the tires, brand, type, and/or other data related to the tires.

The user interface 230 may also provide options associated with driver data for a virtual driver of the virtual vehicle. While the user may define features of the virtual vehicle via the options 232-240, the options 242-250 relate to a virtual driver of the virtual vehicle. Specifically, a gender option 242, an age option 244, a driver type option 246, an emotional state option 248, and a distractions option 250 are provided in the user interface 230.

In response to selection of the gender option 242, the user may define the gender of the virtual driver. In response to selection of the age option 244, the user may define the age of the virtual driver. In response to selection of the driver type option 246, the user may define a type of driver (such as defensive, aggressive, emotional, expert, proficient, novice, etc.). In some embodiments, the user may also define a driving history, a number of years of experience, etc. In response to selection of the emotional state option 248, the user may define the current emotional state of the virtual driver such as calm, angry, aggravated, scared, etc. In response to selection of the distractions option 250, the user may identify any distractions to the virtual driver, such as passengers, mobile device, radio, etc.

Also provided in the user interface 230 are a create vehicle option 252, a create fleet option 254, and an additional vehicles option 256. In response to selection of the create vehicle option 252, the virtual vehicle may be created with the user's defined characteristics. To the extent that the user does not define a particular characteristic, some embodiments may automatically populate the missing characteristics. In response to selection of the create fleet option 254, a fleet of virtual vehicles may be created and/or the user may be navigated to the user interface 330 in FIG. 3. In response to selection of the additional vehicles option 256, the user may be provided options for creating other virtual vehicles, which may or may not be part of the same virtual vehicle fleet.

Figure 3:
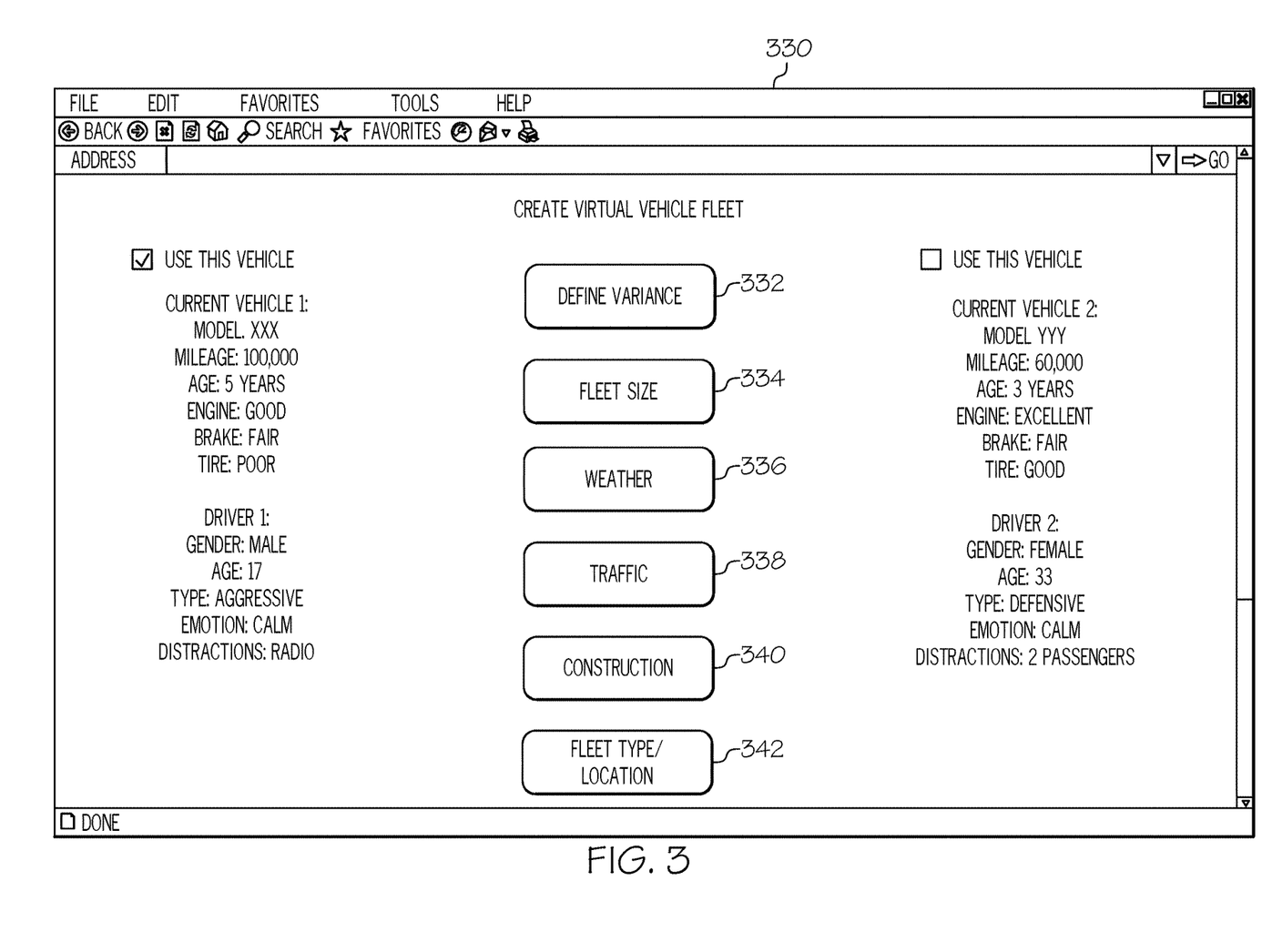
FIG. 3 depicts user interface for creating a virtual vehicle fleet, according to embodiments described herein.

FIG. 3 depicts user interface 330 for creating a virtual vehicle fleet, according to embodiments described herein. As illustrated, the user interface 330 may include information associated with previously created virtual vehicle and may provide a listing of the selected features. If the user created a plurality of virtual vehicles, the options may be provided to replicate or not replicate those virtual vehicles for inclusion into the present virtual vehicle fleet. Also provided are a variance option 332, a fleet size option 334, a weather option 336, a traffic option 338, a construction option 340, and a fleet type/location option 342.

In response to selection of the variance option 332, a predetermined variance of the virtual fleet may be defined. Specifically, the user may indicate that the vehicle fleet includes exactly the same vehicles and exactly the same virtual drivers. However, because this is an unlikely scenario in the real world, by selecting the variance option 332, the user may define which vehicle features and/or driver features that have variance within the virtual vehicle fleet and how much variance is included in the virtual vehicle fleet.

As an example, if the virtual vehicle fleet is a rental car fleet, the vehicles may be very similar and thus have very little variance. However, the drivers of the rental car fleet may have a large amount of variance. Accordingly, the user may be provided with options to indicate that the vehicle variance is 5% (e.g., 5% of the vehicles in the fleet are different from the user created virtual vehicle), as well as options for the user to designate which vehicle features are fixed (no variance) and which have variance. In some embodiments, the user may specify a variance for each vehicle feature. The user may define driver variance in a similar manner as vehicle variance.

It should be understood that while variance may be defined by a percentage, this is merely an example. Some embodiments may include options to create a standard variance for the particular feature. As an example, if the user specifies that the virtual vehicle fleet is a rental car fleet, a standard variance for each feature may be known, based on an average rental car fleet. If the vehicle fleet is a typical fleet of New York downtown vehicles, the variance may be much more diverse. Thus, the user may specify the fleet type to automatically determine variance parameters.

It should also be understood that selection of the variance option may provide the user with the ability to quickly replicate a virtual vehicle with minimal effort by the user. Some embodiments however, may provide an option to manually input (or download) the data for each virtual vehicle to create the virtual vehicle fleet.

In response to selection of the fleet size option 334, the user may define the number of virtual vehicles in the virtual vehicle fleet. Depending the embodiment, the user may also define the number of vehicles with certain features (e.g., 10 taxis, 15 ambulances, 105 sedans, 207 Virtual Vehicle 1's, 308 Virtual Vehicle 2's, etc.). In response to selection of the weather option 336, the user may define the weather condition for each virtual vehicle, a plurality of virtual vehicles and/or the virtual vehicle fleet as a whole. In response to selection of the traffic option 338, the user may define at least one traffic condition for one or more virtual vehicles in the virtual vehicle fleet. In response to selection of the construction option 340, the user may specify whether any vehicles experience a construction condition in the specified location. In response to selection of the fleet type/location option 342, the user may determine the type of virtual vehicle fleet and/or the geographic location of the virtual vehicle fleet.

Specifically, the fleet type may include a taxi fleet, a rental car fleet, an ambulance fleet, a telematics service subscriber fleet, etc. As such, in response to selection of the fleet type/location option 342, the user may designate one or more fleet types for the virtual vehicle fleet. Similarly, the user may also designate the location for the virtual vehicle fleet. Depending on the particular embodiment, the user may wish to specify street level granularity with regard to location or may wish to designate nationwide and/or worldwide locations. As an example, the user may select a metropolitan area, a neighborhood, a city, a state, a region, a country, and/or a plurality of any of these. As such, when the virtual vehicle fleet is being simulated, the specified location may be utilized to include non-fleet vehicles into the simulation, based on characteristics of that location (e.g., traffic topography, construction, etc.).

Figure 4:
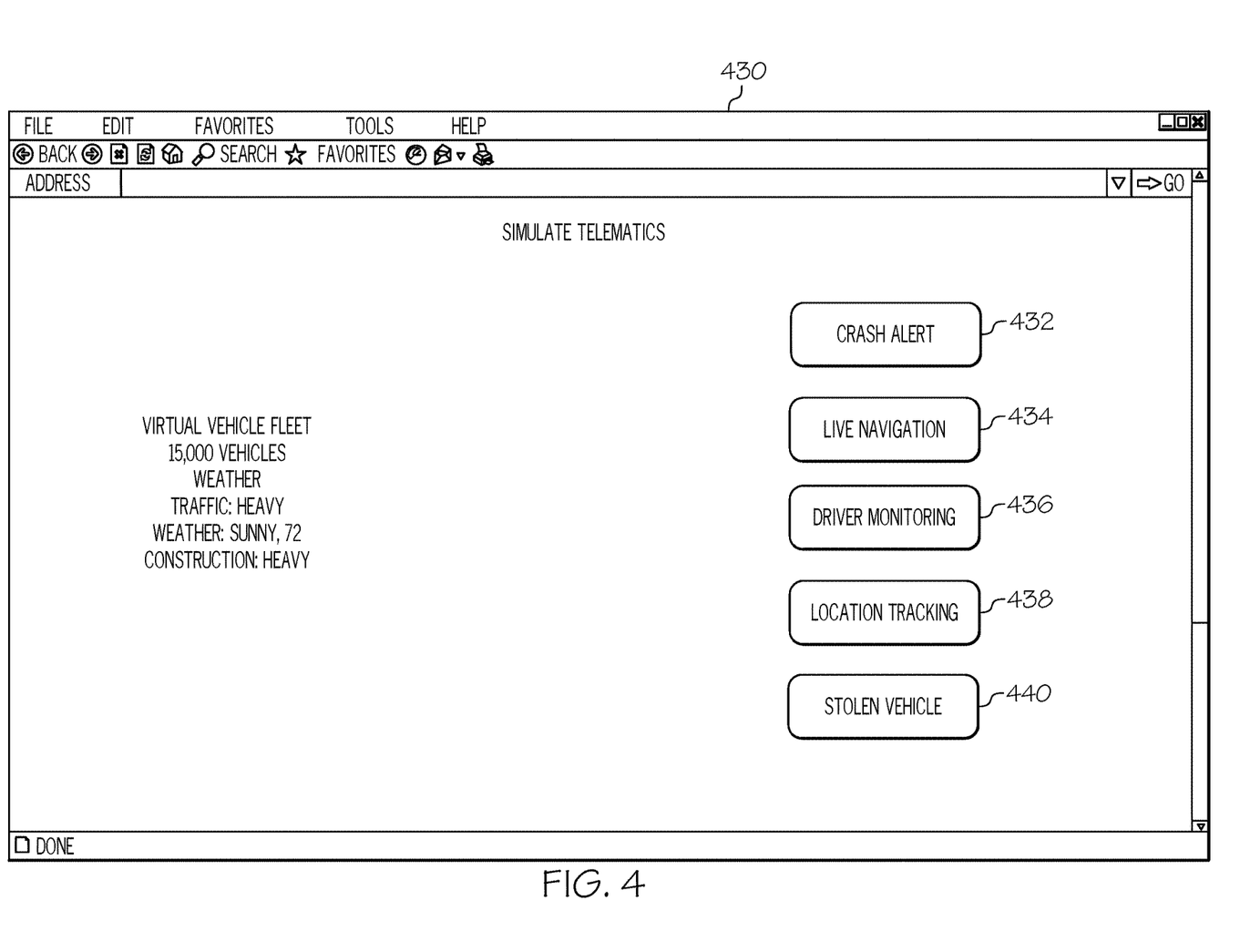
FIG. 4 depicts a user interface for simulating a telematics service on a virtual vehicle fleet, according to embodiments described herein.

FIG. 4 depicts a user interface 430 for simulating a telematics service on a virtual vehicle fleet, according to embodiments described herein. As illustrated, the user interface 430 may provide one or more options associated with the telematics service that the user is simulating. Specifically, the user interface 430 includes a crash alert option 432, a live navigation option 434, a driver monitoring option 436, a location tracking option 438, and a stolen vehicle option 440.

In response to selection of the crash alert option 432, the user may initiate a crash alert service on the virtual vehicle fleet and/or may define characteristics of the simulated telematics service. As an example, the user may indicate the number of crash alerts that are received over a predetermined time, a percentage of the virtual vehicle fleet that experienced a crash, a number of dispatchers that service the virtual vehicle fleet; etc.

Similarly, in response to selection of the live navigation option 434, a live navigation service may be implemented on the virtual vehicle fleet and/or options may be defined. As an example, the user may specify the number and types of user requests that have been received, a percentage of the virtual vehicle fleet that provided requests, etc. In response to selection of the driver monitoring option 436, features and options associated with the driver monitoring service may be defined and/or the driver monitoring telematics service may be implemented on the virtual vehicle fleet. In response to selection of the location tracking option 438, features and options may be defined and/or the location tracking service may be implemented. In response to selection of the stolen vehicle option 440, options associated with the stolen vehicle service may be defined and/or the stolen vehicle telematics service may be implemented on the virtual vehicle fleet.

It should be understood that while the user interface 430 lists a plurality of telematics services that may be simulated, this is merely an example. Other services, such as a vehicle activation service, a destination setting service, and/or a vehicle health check service may also be implemented. Similarly, some embodiments may be configured to implement a portion of a vehicle telematics service. As an example, options may be provided to test communication between different virtual head units and the responder computing device for crash detection, but response data may be ignored.

Figure 5:
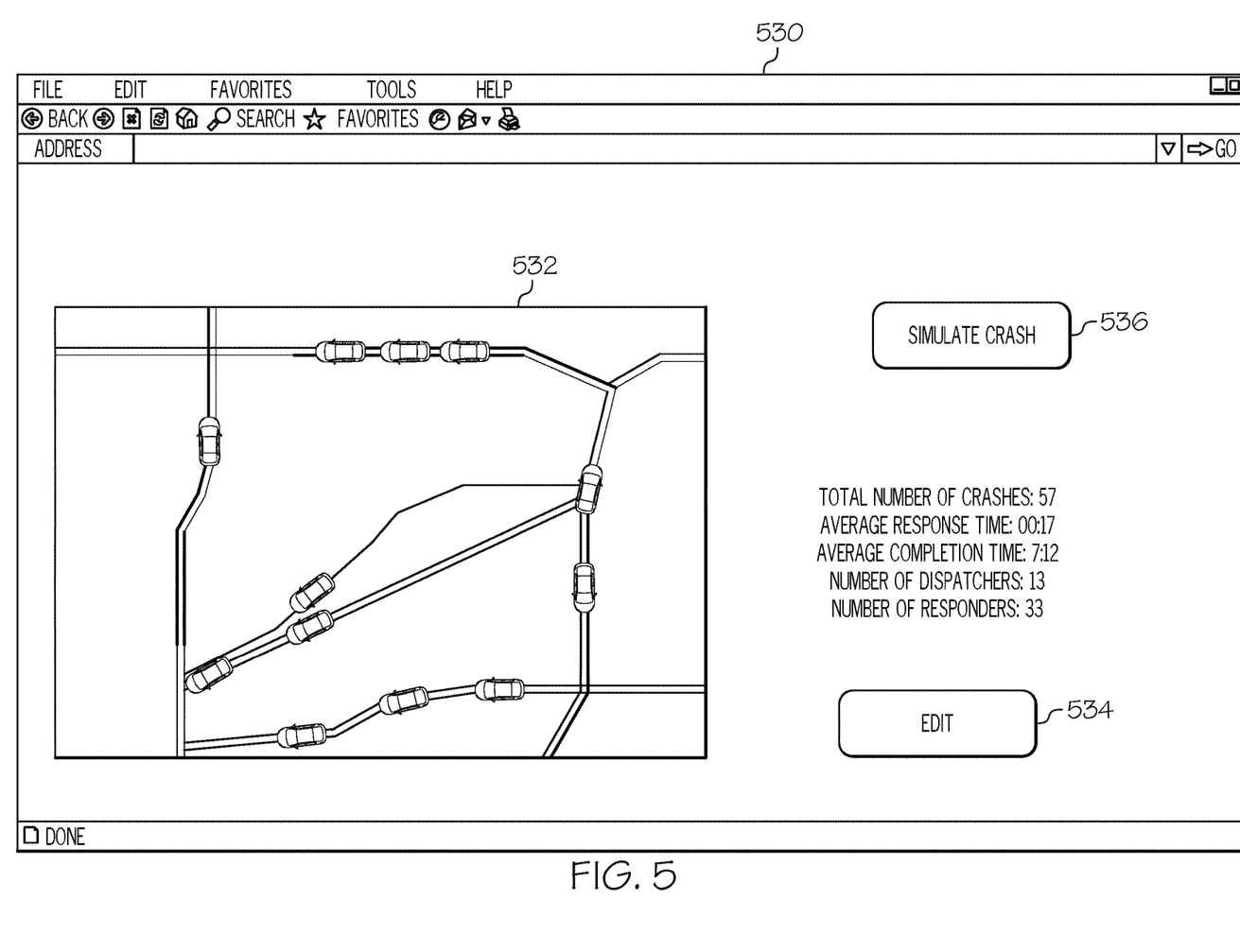
FIG. 5 depicts a simulation of a telematics service on a virtual vehicle fleet, according to embodiments described herein.

FIG. 5 depicts a user interface 530 with a simulation of a telematics service on a virtual vehicle fleet, according to embodiments described herein. As illustrated, the user interface 530 may provide a map 532 of the specified location for the virtual vehicle fleet, with one or more virtual vehicles. The virtual vehicles depicted in the map 532 may or may not be part of the virtual vehicle fleet. As an example, a plurality of virtual vehicle fleets may be provided in the simulation, where only one virtual vehicle fleet (or a subset of virtual vehicle fleets) is actually being tested. In some embodiments, the simulation computing device 106 may create a de facto virtual vehicle fleet that would simulate traffic of the selected geographic location, but is not utilized in testing the response characteristics of the telematics service.

Also provided in the user interface 530 are data associated with the selected telematics service, as well as an edit option 534 for editing at least a portion of the data. Calculations of response time, completion time, etc. may be affected by these changes. As an example, the user may specify the number of collisions, types of collisions, injury totals, etc. to more accurately determine the response time, communication quality, and/or overall quality of service provided. Also provided is a simulate option 536 for implementing the simulation based on data associated with the telematics service and the virtual vehicle fleet. Once the simulation is run, the data in the user interface 530 (and/or other measured data) may be provided. This data may be compared against benchmarks and/or otherwise analyzed to determine problems and/or solutions with the current response characteristics.

Figure 6:
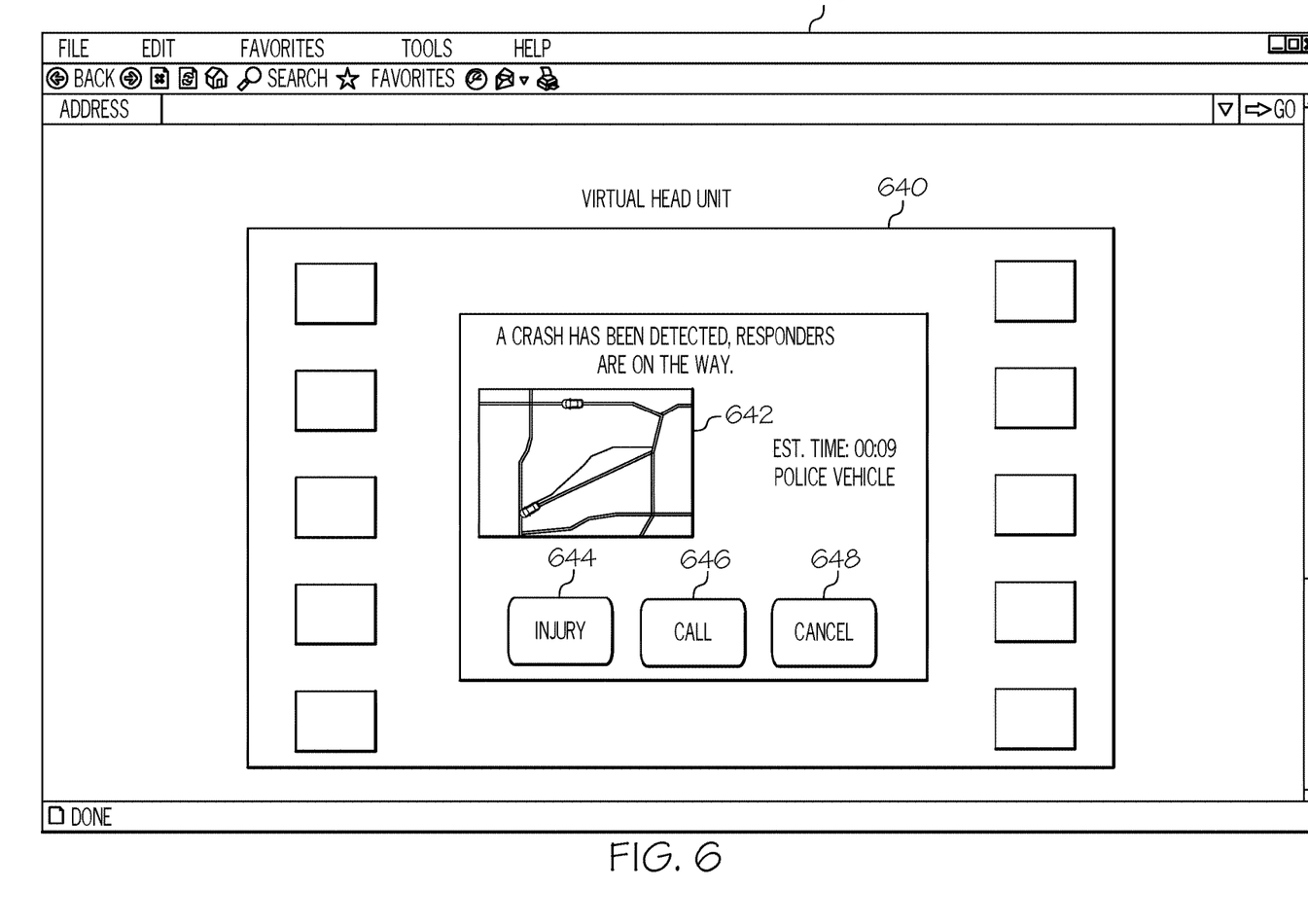
FIG. 6 depicts a virtual head unit for providing a telematics service, according to embodiments described herein.

FIG. 6 depicts a user interface 630 with a display from a virtual head unit 640 for providing a telematics service, according to embodiments described herein. The virtual head unit 640 may be configured to simulate an interface that the virtual driver would be presented in using the selected telematics service. As such, the virtual head unit 640 may provide a map 642 that shows the virtual vehicle. Data regarding time to service, type of service, etc. may also be provided, as well as an injury option 644, a call option 646, and a cancel option 648.

Specifically, the example of FIG. 6 is that of a crash alert telematics service. As such, the simulation may monitor the response time of responders and dispatchers, communications, and the like, as well as any errors or difficulties that are realized on the system level (e.g., lost communication from the virtual vehicles to the dispatcher computing device 104). Based on these difficulties, solutions may be determined to address these issues.

However, part of that assessment may include an analysis on a vehicle level to determine a driver's experience. As such, the virtual head unit 640 may provide an injury option 644 for the user to indicate whether anyone in the virtual vehicle has been injured. In response to selection of the call option 646, the virtual head unit 640 may facilitate a telephone call to a dispatcher. In response to selection of the cancel option 648, the user may cancel the telematics response to the detected crash.

As the virtual vehicle fleet may include a plurality of virtual vehicles with differing virtual head units, embodiments described herein may analyze the user experience and communications with the various types of head units. As such, analysis of this data (and/or other data) may be performed, based on the type of virtual head unit. As an example, an analysis of type A versus type B virtual head unit communications may be performed.

Figure 7:
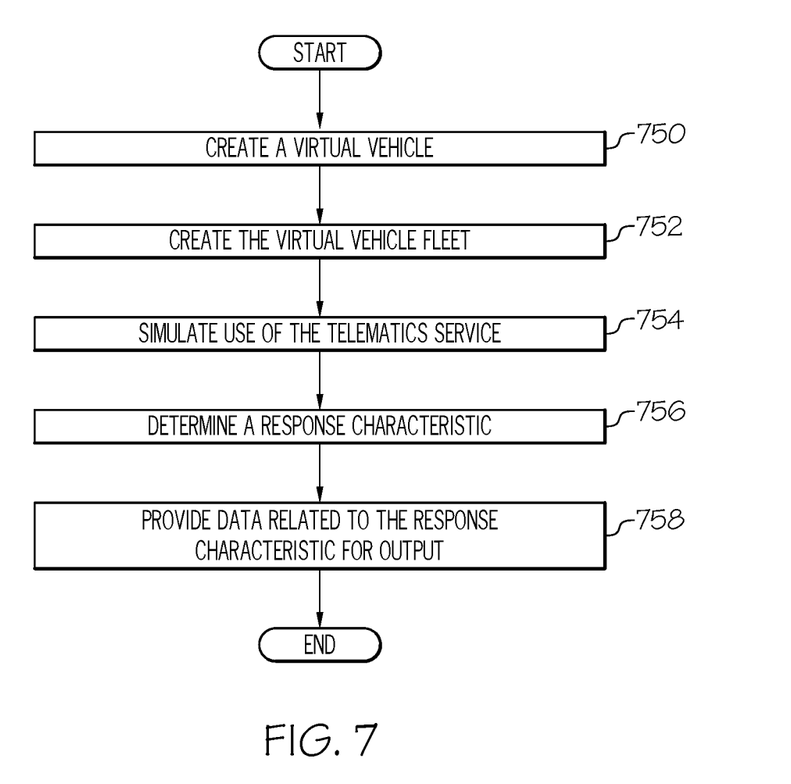
FIG. 7 depicts a flowchart for providing a virtual vehicle fleet, according to embodiments described herein.

FIG. 7 depicts a flowchart for providing a virtual vehicle fleet, according to embodiments described herein. As illustrated in block 750, a virtual vehicle may be created, where the virtual vehicle provides a telematics service. In block 752, the virtual vehicle may be replicated to create a virtual vehicle fleet, where the virtual vehicle fleet includes a plurality of virtual vehicles. In block 754, use of the telematics service may be simulated on at least a portion of the vehicle fleet. In block 756, a determination may be made regarding a response characteristic of the simulated telematics service of the virtual vehicle fleet. In block 758, data related to het response characteristic may be provided for output.

Figure 8:
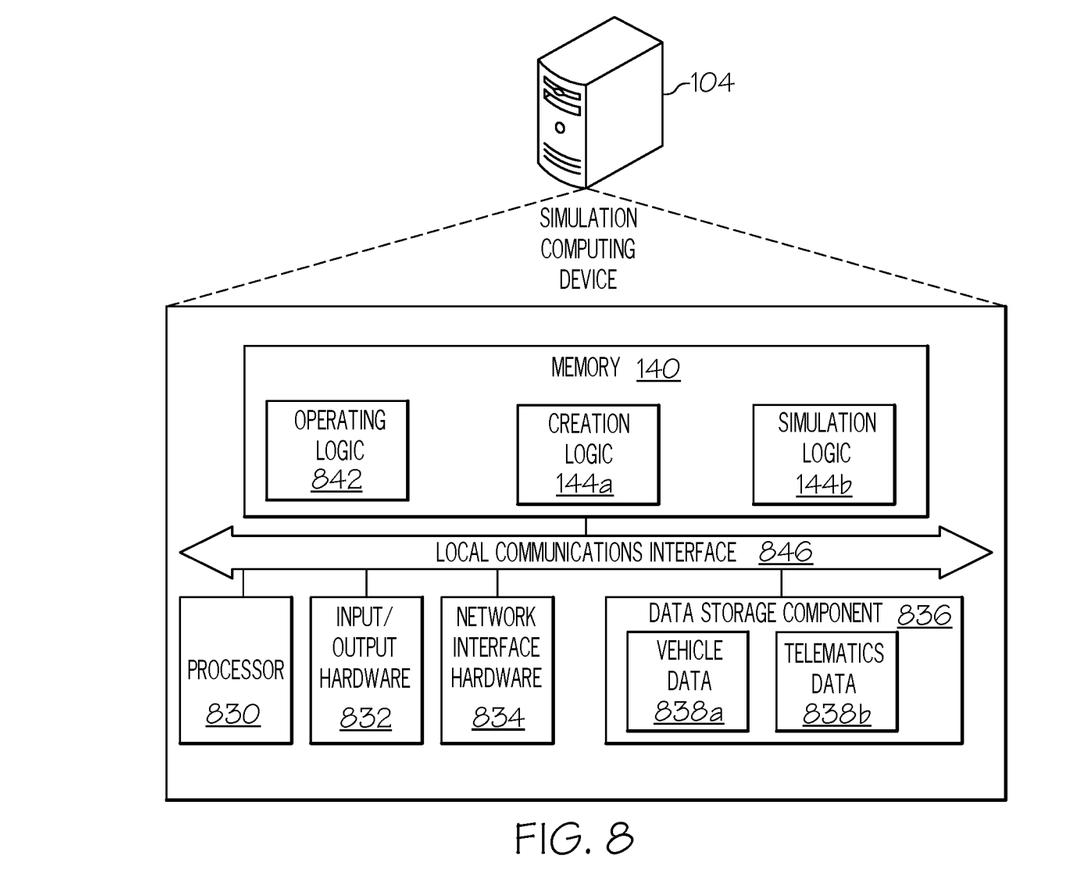
FIG. 8 depicts a computing device for providing a virtual vehicle fleet, according to embodiments described herein.

FIG. 8 depicts a simulation computing device 106 for providing a virtual vehicle fleet, according to embodiments described herein. The simulation computing device 106 includes a processor 830, input/output hardware 832, network interface hardware 834, a data storage component 836 (which stores vehicle data 838*a*, telematics data 838*b*, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the simulation computing device 106 and/or external to the simulation computing device 106.

The memory component 140 may store operating logic 842, the creation logic 144*a* and the simulation logic 144*b*. The creation logic 144*a* and the simulation logic 144*b* may each include a plurality of different pieces of logic, each of which may be embodied as a computer program, firmware, and/or hardware, as an example. A local communications interface 846 is also included in FIG. 8 and may be implemented as a bus or other communication interface to facilitate communication among the components of the simulation computing device 106.

The processor 830 may include any processing component operable to receive and execute instructions (such as from a data storage component 836 and/or the memory component 140). As described above, the input/output hardware 832 may include and/or be configured to interface with components of other devices.

The network interface hardware 834 may include and/or be configured for communicating with any wired or wireless networking hardware, including an antenna, a modem, LAN port, wireless fidelity (Wi-Fi) card, WiMax card, Bluetooth chip, USB card, mobile communications hardware, and/or other hardware for communicating with other networks and/or devices. From this connection, communication may be facilitated between the simulation computing device 106 and other computing devices, such as those depicted in FIG. 1.

The operating logic 842 may include an operating system and/or other software for managing components of the simulation computing device 106. As also discussed above, the creation logic 144*a* may reside in the memory component 140 and may be configured to cause the processor 830 to create a virtual vehicle and/or virtual vehicle fleet. Similarly, the simulation logic 144*b* may be utilized to simulate a telematics service utilized by the virtual vehicle and/or virtual vehicle fleet.

It should be understood that while the components in FIG. 8 are illustrated as residing within the simulation computing device 106, this is merely an example. In some embodiments, one or more of the components may reside external to the simulation computing device 106. It should also be understood that, while the simulation computing device 106 is illustrated as a single device, this is also merely an example. In some embodiments, the creation logic 144*a* and the simulation logic 144*b* may reside on different computing devices. As an example, one or more of the functionalities and/or components described herein may be provided by the user computing device 102 and/or the dispatcher computing device 104, which may be coupled to the simulation computing device 106 via the network 100.

Additionally, while the simulation computing device 106 is illustrated with the creation logic 144*a* and the simulation logic 144*b* as separate logical components, this is also an example. In some embodiments, a single piece of logic may cause the simulation computing device 106 to provide the described functionality.

As illustrated above, various embodiments for providing a virtual vehicle fleet are disclosed. These embodiments may provide a user with the ability to simulate a response time on a telematics service for a fleet of vehicles without having to physically implement the fleet or service. Additionally various scenarios may be simulated to provide data related to situations that would be impossible to create in the physical world with consistency. This creates a more accurate and robust system when implemented in the physical world. Thus, embodiments described herein provide a computing solution to an inherently computing-based problem.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for providing a virtual vehicle fleet. It should also be understood that these embodiments are merely exemplary and are not intended to limit the scope of this disclosure.

What is claimed is:

1. A method for providing a virtual vehicle fleet comprising:
   creating, by a computing device, a virtual vehicle, wherein the virtual vehicle provides a telematics service;
   replicating, by the computing device, the virtual vehicle to create the virtual vehicle fleet, wherein the virtual vehicle fleet includes a plurality of virtual vehicles;
   simulating, by the computing device, use of the telematics service by at least a portion of the virtual vehicle fleet;
   determining, by the computing device, a response characteristic of the simulated telematics service used by the virtual vehicle fleet; and
   providing, by the computing device, data related to the response characteristic for output.

2. The method of claim 1, wherein creating the virtual vehicle includes receiving features from a user regarding at least one of the following: a model of the virtual vehicle, a type of the virtual vehicle, a mileage of the virtual vehicle, an age of the virtual vehicle, a type of virtual head unit, an engine condition of the virtual vehicle, a brake condition of the virtual vehicle, a tire condition of the virtual vehicle, a gender of a virtual driver of the virtual vehicle, an age of the virtual driver of the virtual vehicle, a driver type of the virtual driver of the virtual vehicle, an emotional state of the virtual driver of the virtual vehicle, or a distraction of the virtual driver of the virtual vehicle.

3. The method of claim 1, wherein replicating the virtual vehicle includes receiving user input regarding at least one of the following: a variance of the virtual vehicle to create the virtual vehicle fleet, a size of the virtual vehicle fleet, a weather condition for at least a portion of the virtual vehicle fleet, a traffic condition for at least a portion of the virtual vehicle fleet, and a construction condition for at least a portion of the virtual vehicle fleet.

4. The method of claim 1, wherein the telematics service includes at least one of the following: a crash alert service, a live navigation service, a driver monitoring service, a location tracking service, vehicle activation service, a destination setting service, a vehicle health check service, or a stolen vehicle service.

5. The method of claim 1, further comprising providing a display of a virtual head unit for the virtual vehicle utilizing the telematics service.

6. The method of claim 5, wherein the display of the virtual head unit provides an option to communicate with a virtual dispatcher.

7. The method of claim 1, wherein the response characteristic includes at least one of the following: a response time, a completion time, or a communication quality.

8. A system for providing a virtual vehicle fleet comprising:
   a simulation computing device that includes a memory component that stores logic, that when executed by the simulation computing device, causes the system to perform at least the following:
     receive user input for creating a virtual vehicle, wherein the user input includes at least one characteristic of the virtual vehicle;
     create the virtual vehicle, wherein the virtual vehicle provides a telematics service;
     create the virtual vehicle fleet from the virtual vehicle, wherein the virtual vehicle fleet includes a plurality of virtual vehicles, wherein at least a portion of the plurality of virtual vehicles provides the telematics service;
     simulate use of the telematics service on at least a portion of the virtual vehicle fleet;
     determine a response characteristic of a simulated telematics service of the virtual vehicle fleet; and
     provide data related to the response characteristic for output.

9. The system of claim 8, wherein creating the virtual vehicle includes receiving features from a user regarding at least one of the following: a model of the virtual vehicle, a type of the virtual vehicle, a mileage of the virtual vehicle, an age of the virtual vehicle, a type of virtual head unit, an engine condition of the virtual vehicle, a brake condition of the virtual vehicle, a tire condition of the virtual vehicle, a gender of a virtual driver of the virtual vehicle, an age of the virtual driver of the virtual vehicle, a driver type of the virtual driver of the virtual vehicle, an emotional state of the virtual driver of the virtual vehicle, or a distraction of the virtual driver of the virtual vehicle.

10. The system of claim 8, wherein creating the virtual vehicle fleet includes receiving user input regarding at least one of the following: a variance of the virtual vehicle to create the virtual vehicle fleet, a size of the virtual vehicle fleet, a weather condition for at least a portion of the virtual vehicle fleet, a traffic condition for at least a portion of the virtual vehicle fleet, and a construction condition for at least a portion of the virtual vehicle fleet.

11. The system of claim 8, wherein the telematics service includes at least one of the following: a crash alert service, a live navigation service, a driver monitoring service, a location tracking service, vehicle activation service, a destination setting service, a vehicle health check service, or a stolen vehicle service.

12. The system of claim 8, wherein the logic further causes the system to provide a display of a virtual head unit for the virtual vehicle in utilizing the telematics service.

13. The system of claim 12, wherein the display of the virtual head unit provides an option to communicate with a dispatcher.

14. The system of claim 8, further comprising a dispatcher computing device, wherein the logic further causes the system to engage the dispatcher computing device, in response to the virtual vehicle utilizing the telematics service.

15. A computing device for providing a virtual vehicle fleet comprising:
- a memory component that stores logic, that when executed by the computing device, causes the computing device to perform at least the following:
  - create a virtual vehicle that is a simulation of a physical vehicle and provides a telematics service;
  - create the virtual vehicle fleet from the virtual vehicle, wherein the virtual vehicle fleet includes a plurality of virtual vehicles, wherein there is a predetermined variance among the plurality of virtual vehicles in the virtual vehicle fleet;
  - simulate use of the telematics service by at least a portion of the virtual vehicle fleet;
  - determine a response characteristic of use of the simulated telematics service; and
  - provide data related to the response characteristic for output.

16. The computing device of claim 15, wherein creating the virtual vehicle includes receiving features from a user regarding at least one of the following: a model of the virtual vehicle, a type of the virtual vehicle, a mileage of the virtual vehicle, an age of the virtual vehicle, a type of virtual head unit, an engine condition of the virtual vehicle, a brake condition of the virtual vehicle, a tire condition of the virtual vehicle, a gender of a virtual driver of the virtual vehicle, an age of the virtual driver of the virtual vehicle, a driver type of the virtual driver of the virtual vehicle, an emotional state of the virtual driver of the virtual vehicle, or a distraction of the virtual driver of the virtual vehicle.

17. The computing device of claim 15, wherein creating the virtual vehicle fleet includes receiving user input regarding at least one of the following: a variance of the virtual vehicle to create the virtual vehicle fleet, a size of the virtual vehicle fleet, a weather condition for at least a portion of the virtual vehicle fleet, a traffic condition for at least a portion of the virtual vehicle fleet, and a construction condition for at least a portion of the virtual vehicle fleet.

18. The computing device of claim 15, wherein the telematics service includes at least one of the following: a crash alert service, a live navigation service, a driver monitoring service, a location tracking service, vehicle activation service, a destination setting service, a vehicle health check service, or a stolen vehicle service.

19. The computing device of claim 15, wherein the logic further causes the computing device to provide a display of a virtual head unit for the virtual vehicle utilizing the telematics service.

20. The computing device of claim 19, wherein the display of the virtual head unit provides an option to communicate with a dispatcher.

* * * * *